US008914782B2

(12) United States Patent
Isard et al.

(10) Patent No.: US 8,914,782 B2
(45) Date of Patent: Dec. 16, 2014

(54) OPTIMIZATION OF DECLARATIVE QUERIES

(75) Inventors: Michael Isard, San Francisco, CA (US); Yuan Yu, Cupertino, CA (US); Derek Gordon Murray, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 12/943,038

(22) Filed: Nov. 10, 2010

(65) Prior Publication Data

US 2012/0117551 A1    May 10, 2012

(51) Int. Cl.
*G06F 9/45* (2006.01)
(52) U.S. Cl.
CPC ............ *G06F 8/4441* (2013.01); *G06F 8/4452* (2013.01); *G06F 8/443* (2013.01)
USPC ............................ 717/160; 717/151; 717/150
(58) Field of Classification Search
CPC .................................. G06F 8/443; G06F 8/41
USPC .......................... 717/140, 150–151, 159–160
See application file for complete search history.

(56) References Cited

U.S. PATENT DOCUMENTS

| 5,905,894 | A | 5/1999 | De Bonet | |
|---|---|---|---|---|
| 6,075,942 | A | 6/2000 | Cartwright, Jr. | |
| 7,680,765 | B2 | 3/2010 | Meijer et al. | |
| 2003/0115573 | A1 | 6/2003 | Syme et al. | |
| 2005/0183058 | A1* | 8/2005 | Meijer et al. | 717/100 |
| 2005/0183071 | A1* | 8/2005 | Meijer et al. | 717/140 |
| 2005/0278714 | A1* | 12/2005 | Vahid et al. | 717/159 |
| 2008/0052688 | A1* | 2/2008 | O'Brien et al. | 717/140 |
| 2008/0163160 | A1 | 7/2008 | Bloesch et al. | |
| 2008/0244516 | A1* | 10/2008 | Meijer et al. | 717/116 |
| 2009/0083724 | A1* | 3/2009 | Eichenberger et al. | 717/160 |
| 2009/0144229 | A1* | 6/2009 | Meijer et al. | 707/2 |

OTHER PUBLICATIONS

Koskinen, Johannes, "Metaprogramming in C++" Retrieved at << http://www.cs.tut.fi/~kk/webstuff/MetaprogrammingCpp.pdf >>, Mar. 9, 2004, pp. 14.
Brand, Mark Van Den, "Generic Language Technology: Basics for Automated Software Engineering" Retrieved at << http://www.ercim.eu/publication/Ercim_News/enw58/van_den_brand.html >>, ERCIM News No. 58, Jul. 2004, pp. 2.
Terwilliger, et al., "Language Integrated Querying of XML Data in SQL Server", Retrieved at << http://www.vldb.org/pvldb/1/1454182.pdf >>, Aug. 23, 2008, pp. 4.

(Continued)

*Primary Examiner* — Lewis A Bullock, Jr.
*Assistant Examiner* — Tina Huynh
(74) *Attorney, Agent, or Firm* — Micah Goldsmith; Leonard Smith; Micky Minhas (57) ABSTRACT

Source code is generated that includes one or more iterator-based expressions such as declarative queries. The source code is translated into an intermediate language that classifies operators making up the iterator-based expressions into classes based on whether the operators are aggregating, element-wise, or sink operators. The intermediate language, including the identified classes, is processed using an automaton to replace the iterator-based expressions with one or more equivalent non-iterator-based expressions. Where an iterator-based expression is nested, the nested expression is processed using an equivalent number of nested automatons. The resulting optimized source code may be compiled and executed using fewer virtual function calls than the equivalent non-optimized source code.

18 Claims, 6 Drawing Sheets

(56) References Cited

OTHER PUBLICATIONS

Yu, et al., "DryadLINQ: A System for General-Purpose Distributed Data-Parallel Computing Using a High-Level Language" Retrieved at << http://research.microsoft.com/en-us/projects/dryadlinq/dryadlinq.pdf >>, USENIX Association, 2008, pp. 14.

Syme, Don, "Leveraging .NET Meta-programming Components from F#" Retrieved at << http://citeseerx.ist.psu.edu/viewdoc/download?doi=10.1.1.91.1631&rep=rep1&type=pdf >>, Sep. 16, 2006, pp. 12.

Chamberlin, et al., "A History and Evaluation of System R", Retrieved at << http://www.cs.berkeley.edu/~brewer/cs262/SystemR.pdf >>, Communications of the ACM, vol. 24, No. 10, Oct. 1981, pp. 632-646.

Johnsson, Thomas, "Efficient Compilation of Lazy Evaluation", Retrieved at << http://citeseerx.ist.psu.edu/viewdoc/download;jsessionid=BB2DB5AA29987278AC14CF44385806EB?doi=10.1.1.47.4238&rep=rep1&type=pdf >>, ACM SIGPLAN Notices—Best of PLDI 1979-1999, vol. 39, No. 4, Apr. 2004, pp. 22.

"Generating Code for Holistic Query Evaluation", Retrieved at << http://ieeexplore.ieee.org/stamp/stamp.jsp?tp=&arnumber=5447892 >>, Data Engineering (ICDE), 2010 IEEE 26th International Conference, Mar. 1-6, 2010, pp. 613-624.

Marlow, et al., "Faster Laziness Using Dynamic Pointer Tagging", Retrieved at << http://research.microsoft.com/en-us/um/people/simonpj/papers/ptr-tag/ptr-tagging.pdf >>, ACM SIGPLAN Notices—Proceedings of the ICFP '07 conference, vol. 42, No. 9, Sep. 2007, pp. 277-288.

Burn, et al., "The Spineless G-Machine", Proceedings of the 1988 ACM, conference on LISP and functional programming, 1988, pp. 244-258.

Chambers, et al., "FlumeJava: Easy, Efficient Data-Parallel Pipelines", Proceedings of the 2010 ACM SIGPLAN conference,on Programming language design and implementation, 2010, pp. 363-375.

Freytag, et al., "On the Translation of Relational Queries into Iterative Programs", ACM Transactions on Database Systems, vol. 14, No. 1, Mar. 1989, pp. 1-27.

Peyton, et al., "The spineless tagless G-machine", retrieved at <<http://doi.acm.org/10.1145/99370.99385>>, In FPCA '89: Proceedings of the fourth international conference on Functional programming languages and computer architecture, 1989, pp. 184-201.

\* cited by examiner

OPTIMIZATION OF DECLARATIVE QUERIES

BACKGROUND

Iterators have become popular features in programming languages. Iterators provide an abstraction between a particular data structure and the functions that use them. Thus, a function may use values contained or exposed by an iterator without knowing how they are stored, maintained, or calculated by an underlying data structure.

The language integrated query ("LINQ") programming language extensions provide a further abstraction where developers may specify computations over data sets using declarative queries. These declarative queries are typically implemented using one or more iterators and may similarly be used without knowing how the underlying queries are implemented.

While such declarative queries and iterators are popular because they greatly simplify the code generated by a programmer, their usage may lead to excessive performance penalties. Many programming languages use virtual function calls to implement iterators and/or declarative queries which are computationally expensive. Moreover, declarative queries are often nested, resulting in even greater performance penalties.

SUMMARY

Source code is generated that includes one or more iterator-based expressions such as declarative queries. The source code is translated into an intermediate language that classifies operators making up the iterator-based expressions into classes based on whether the operators are aggregating, element-wise, or sink operators. The intermediate language, including the identified classes, is processed using an automaton to replace the iterator-based expressions with one or more equivalent non-iterator-based expressions. Where an iterator-based expression is nested, the nested expression is processed using an equivalent number of nested automatons. The resulting optimized source code may be compiled and executed using fewer virtual function calls than the equivalent non-optimized source code.

In an implementation, a source code file is received by a computing device. The source code file includes one or more iterator-based expressions. For each of the iterator-based expressions, one or more non-iterator-based expressions that are functionally equivalent to the iterator-based expression are generated by the computing device. The generated non-iterator-based expressions are associated with the source code file by the computing device. The source code file and the associated non-iterator-based expressions are compiled to generate a computer executable program by the computing device.

In an implementation, one or more iterator-based expressions are identified in a source code file by a computing device. For each identified iterator-based expression, a string (e.g., a sequence of intermediate language symbols) is generated from the iterator-based expression, the generated string is processed using an automaton to generate one or more non-iterator-based expressions that are functionally equivalent to the iterator-based expression, and the iterator-based expression in the source code file is replaced with the generated non-iterator-based expressions. The source code file is used to generate a computer executable program.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
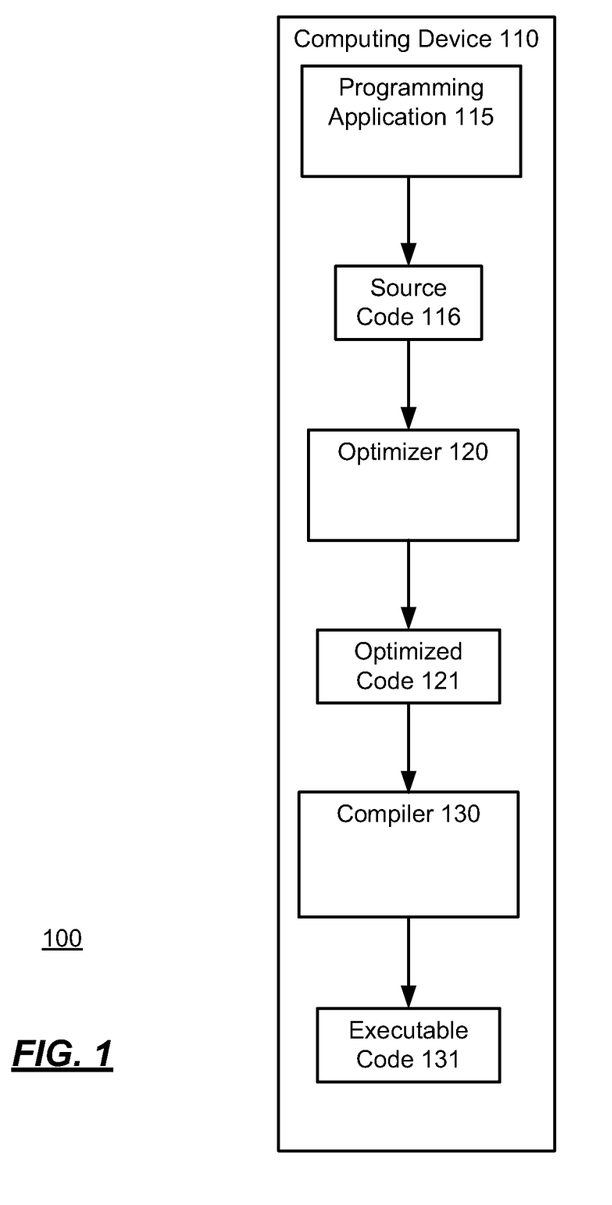
FIG. 1 is an illustration of an example environment for optimizing source code that includes one or more iterator-based expressions.

FIG. 1 is an illustration of an example environment 100 for optimizing source code that includes one or more iterator-based expressions. The environment 100 may include a computing device 110 that implements a programming application 115, an optimizer 120, and/or a compiler 130. The computing device 110 may be a general purpose computing device, such as the computing system 600 illustrated in FIG. 6. While only one computing device 110 is shown executing the programming application 115, optimizer 120, and compiler 130, it is for illustrative purposes only; each of the various components may be executed by one or more additional computing devices.

The programming application 115 may be used by a user to generate source code 116. The user may generate the source code 116 by typing, selecting, or otherwise inputting one or more expressions in a particular programming language. An expression may include a valid line or lines of code written according to a syntax associated with the programming language. Each expression may further include one or more operators specified by the syntax of the programming language. The programming language used by the programming application 115 may include any programming language known in the art including, but not limited to, Java, C#, and Visual Basic, for example. The programming application 115 may be any one of a variety of programming applications including a text editor or integrated development environment ("IDE"), for example.

In some implementations, the programming language that the source code 116 is written in may support what are referred to herein as iterator-based expressions. An iterator is an abstraction between the internal representation of a data structure and the functions and methods that operate on the data structure. An iterator-based expression may be an expression in a programming language that uses an iterator, or whose implementation is based on an iterator. An example of such an iterator-based expression is the declarative query used by the LINQ programming language. Other types of iterator-based expressions may also be used.

For example, consider an example program (1) that determines the sum of numbers in an array xs without using iterators or iterator-based expressions:

```
int[ ] xs={4, 1, 5, 3, 7, 4, ... };

int total=0;

for (int i=0; i<xs.Length; ++i)

total=+xs[i];                                             (1)
```

As illustrated, a variable total is instantiated to store a current sum of the values in the array xs. A "for" loop steps through the array xs and adds the value from the $i^{th}$ element of the array xs to "total" while i is less than the length of the array xs.

In contrast, consider the example program (2), written using the LINQ programming language extensions, that is implemented using an iterator-based expression, specifically a declarative query:

```
int[ ] xs={4, 1, 5, 3, 7, 4, ... };

int total=xs.Sum( );                                         (2)
```

Rather than using a "for" loop to step through the array xs as in the example program (1), the example program (2) instantiates the variable total and sets it equal to the output of the declarative query Sum on the array xs. As can be appreciated, using the iterator-based declarative query Sum simplifies program (2) because the user does not have to create their own "for" loop, and otherwise determine how to implement the sum of the array xs. Further, the readability of program (2) is also improved over program (1).

A declarative query may be applied to any enumerable data structure, i.e., any data structure for which an iterator may be obtained. These include arrays, lists, sets, database tables, partitioned data sets, and the results of a previous query, for example.

While the benefits to the programmer in using such iterator-based expressions are apparent, they also introduce additional overhead in terms of computational resources. For example, consider how the Sum declarative query is implemented in the LINQ programming language extensions as illustrated by example program (3):

```
public static int Sum (this IEnumerable<int>source)

{ int total=0;

IEnumerable<int>_e=source.GetEnumerator( );

while (_e.MoveNext( ))

total+=_e.Current;

return total;

}                                                            (3)
```

The methods source.GetEnumerator, _e.MoveNext, and _e.Current used in program (3) are all virtual functions, which are typically more computationally expensive than non-virtual functions. Moreover, because of the "while" loop construct, the implementation of Sum as illustrated in program (3) makes 2n+1 virtual function calls, where n is the number of elements in the array being summed.

Accordingly, the optimizer 120 may receive generated source code 116 from the programming application 115, and may optimize the source code 116 to generate an optimized code 121. The optimizer 120 may generate the optimized code 121 by identifying iterator-based expressions, and replacing some or all of the identified iterator-based expressions with one- or more non-iterator-based expressions such as "for" loops or "while" loops. The non-iterator-based expressions may be functionally equivalent to the iterator-based expressions, meaning that the execution of the non-iterator-based expressions by a computing device may result in the same value or values as their corresponding iterator-based expressions. For example, the optimizer 120 would optimize example program (2) described above by replacing the iterator-based expressions with the non-iterator-based expressions from the example program (1).

The optimizer 120 may generate optimized code 121 based on the source code 116 by replacing some or all of the iterator-based expressions with one or more non-iterator-based expressions. In some implementations, the optimizer 120 may generate the one or more non-iterator-based expressions for one or more of the iterator-based expressions in the source code 116, and may associate the generated expressions with the source code 116. The generated non-iterator-based expressions may be associated or linked with the source code by building a dynamic link library, for example.

Figure 2:
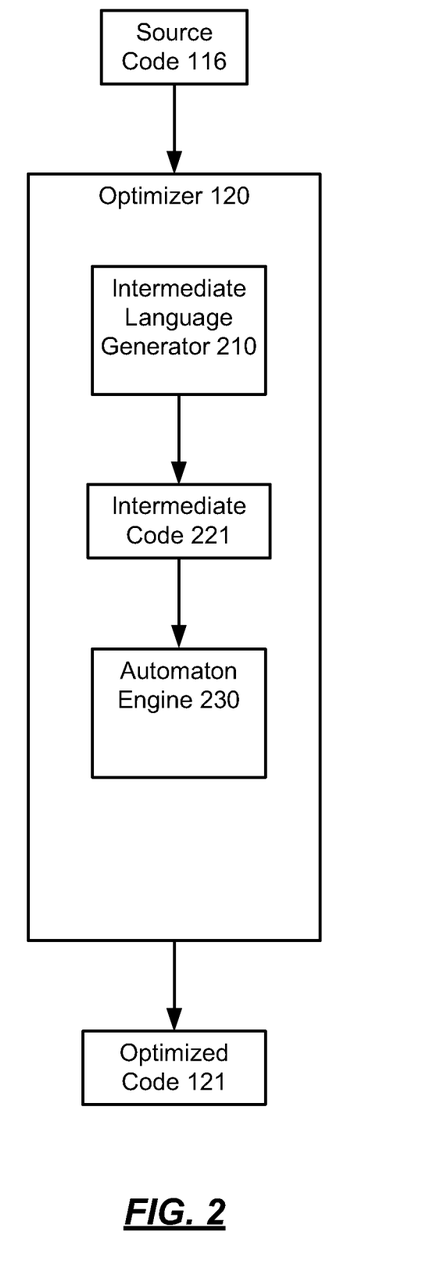
FIG. 2 is an illustration of an example optimizer.

As described further with respect to FIG. 2, in some implementations, the optimizer 120 may generate the optimized code 121 by identifying each iterator-based expression in a source code file, such as the source code 116, and converting each iterator-based expression into a string of an intermediate language. In some implementations, the string may be generated by replacing each operator of the iterator-based expression with a symbol corresponding to a class associated with the operator. The string may then be processed by an automaton that replaces the symbols with predetermined non-iterator-based code such as "for" loops and "while" statements.

Figure 6:
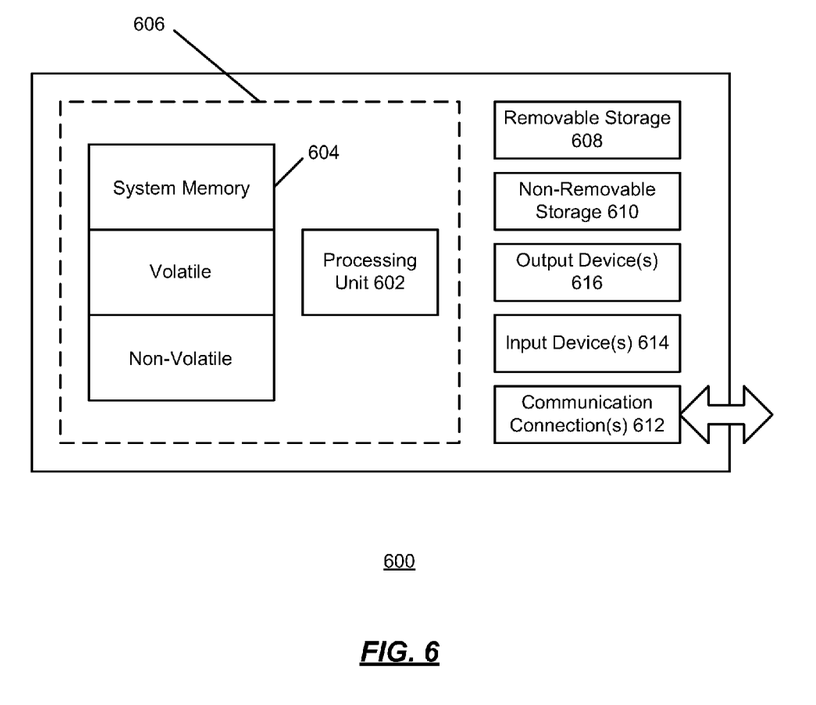
FIG. 6 is a block diagram of an exemplary computing environment in which example embodiments and aspects may be implemented.

The compiler 130 may receive the optimized code 121, and/or the source code 116 and associated non-iterator-based expressions, and may compile the optimized code 121 to generate executable code 131. The executable code 131 may be code that is executable by a general purpose computing device such as the computing system 600.

FIG. 2 is an illustration of an example optimizer 120. The optimizer 120 may include one or more components including, but not limited to, an intermediate language generator 210 and an automaton engine 230. More or fewer components may be supported.

The intermediate language generator 210 may process each iterator-based expression in the source code 116, and convert the iterator-based expressions into an intermediate language or representation. In some implementations, the representation may be a string. Other data structures may also be used. The strings generated for each of the iterator-based expression in the source code 116 are illustrated as intermediate code 221.

In some implementations, the intermediate language generator 210 may generate a string from an iterator-based expression by generating a call symbol c, for example. The call symbol c may indicate the beginning of a string for an iterator-based expression and may be followed by zero or more symbols corresponding to one or more operators of the iterator-based expression. The generated string may be terminated with an end symbol r indicating the end of the string.

The intermediate language generator 210 may process each iterator-based expression and classify each operator in the expression into one or more classes. Each operator may then be represented in the generated string by one or more symbols corresponding to the class of the operator. The particular classes selected may be dependent on the particular programming language used for the source code 116 by the programming application 115. The classes may be defined so that some or all of the operators supported by the programming language are assigned to one of the classes.

For the LINQ programming language, in some implementations, three classes may be supported by the intermediate code generator 210. The three classes may include element-wise operators, aggregating operators, and sink operators. More or fewer classes of operators may be supported.

The element-wise operator class may include operators that take a current element and transform the element into one or more different elements, and operators that take a current element and filter out the current element if it does not match a Boolean predicate. As used herein, an element may include a value, a variable, or a collection of elements. Examples of operators in the element-wise operator class may include the Select operator, the Where operator, and the SelectMany operator. Operators of the element-wise class may be represented by the $\pi$ symbol, for example.

The sink operator class may include operators that take a current element and insert the element into a collection of elements, or other data structures, that may later be enumerated. Examples of operators in the sink operator class may include the GroupBy operator, the OrderBy operator, and the Join operator. Operators of the sink class may be represented by the $\sigma$ symbol, for example.

The aggregating operator class may include operators that reduce elements into a single scalar value. Examples of operators in the aggregating operator class may include the Aggregate operator, the Sum operator, the Min operator, and the Max operator. Operators of the aggregating class may be represented by the $\alpha$ symbol, for example.

The operators of the sink and element-wise operator class transform one collection of elements into another collection, which may contain a different set of elements from the previous collection. Therefore, operators of these classes may be chained together multiple times in any arbitrary order in a string of the intermediate language by the intermediate code generator 210. In contrast, operators of the aggregate operator class return a scalar value and therefore may be the final operator in the intermediate language. Accordingly, each iterator-based expression can be expressed as a string by the intermediate code generator 210 according to the following regular expression (4):

$$L::=c(\pi|\sigma)^*\alpha^?r \qquad (4)$$

Figure 3:
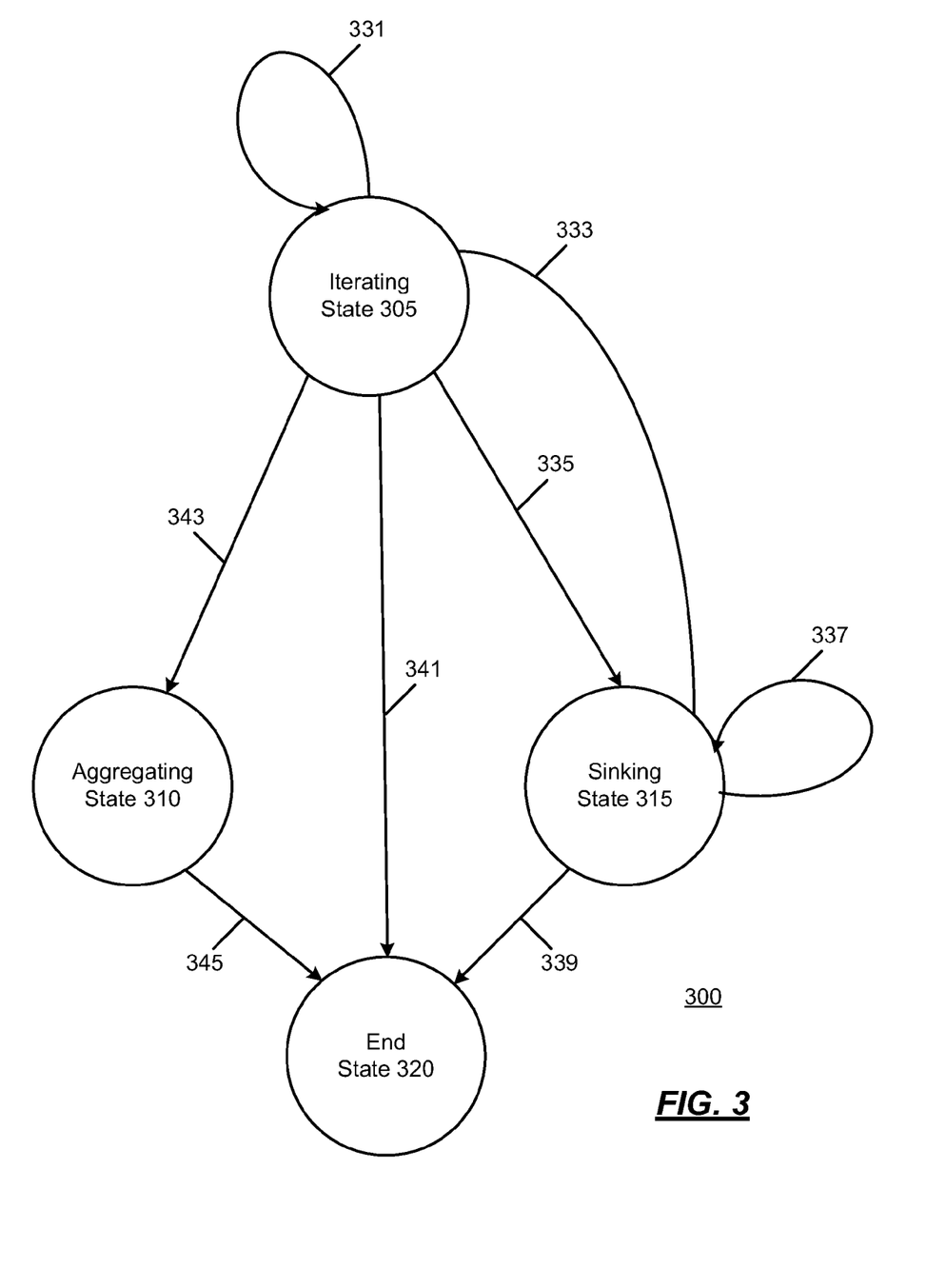
FIG. 3 is an illustration of an example finite state machine.

The automaton engine 230 may generate one or more non-iterator-based expressions from each string of the intermediate code 221. As described above, the intermediate code 221 may include strings generated according to a regular expression; therefore, the automaton engine 230 may generate one or more non-iterator-based expressions from the strings using a finite state machine. An example finite state machine 300 used by the automaton engine 230 is illustrated in FIG. 3.

As shown, the finite state machine 300 includes three states corresponding to the operator classes (i.e., an iterating state 305, an aggregating state 310, and a sinking state 315). The finite state machine 300 also includes an end state 320 corresponding to the end of the string.

The automaton engine 230 may enter the iterating state 305 upon reading the $\pi$ symbol from the string. In the iterating state 305, the automaton engine 230 may generate code corresponding to the iterating operation and may insert the code into the non-iterator-based expression. The code may be generated in a high-level programming language, such as C#, Visual Basic, Java or C, for example. The code may also be generated in a bytecode language such as the common intermediate language (CIL) or Java bytecode, or in a machine code language such as x86 machine code. If the next symbol in the string is a $\pi$ symbol, then the automaton engine 230 may follow the transition 331 and remain in the iterating state 305. If the next symbol in the string is a $\sigma$ symbol, then the automaton engine 230 may follow the transition 335 to the sinking state 315. If the next symbol in the string is a $\alpha$ symbol, then the automaton engine 230 may follow the transition 343 to the aggregating state 310. If the next symbol in the string is an r symbol, then the automaton engine 230 may follow the transition 341 to the end state 320.

The automaton engine 230 may enter the sinking state 315 upon reading the $\sigma$ symbol from the string. In the sinking state 315, the automaton engine 230 may similarly generate code corresponding to the sinking operation and may insert the code into the non-iterator-based expression. If the next symbol in the string is a $\pi$ symbol, then the automaton engine 230 may follow the transition 333 to the iterating state 305. If the next symbol in the string is a $\sigma$ symbol, then the automaton engine 230 may follow the transition 337 and remain in the sinking state 315. If the next symbol in the string is a $\alpha$ symbol, then the automaton engine 230 may follow the transition 333 to the iterating state 305, followed by the transition 343 to the aggregating state 310. If the next symbol in the string is an r symbol, then the automaton engine 230 may follow the transition 339 to the end state 320.

The automaton engine 230 may enter the aggregating state 310 upon reading the $\alpha$ symbol from the string. In the aggregating state 310, the automaton engine 230 may similarly generate code corresponding to the aggregating operation and may insert the code into the non-iterator-based expression. As described above, according to the regular expression, the aggregating operation is the last operation in the string. Therefore, after generating the code for the aggregating operation, the automaton engine 230 may follow the transition 345 to the end state 320.

An instance of a symbol may be associated with one or more user-defined expressions. For example, a $\pi$ symbol may be associated with a unary function that defines an element transformation, or a Boolean predicate that defines a filtering operation. A $\sigma$ symbol may be associated with expressions for initializing a new collection, inserting elements into the collection, and iterating through the new collection. A $\alpha$ symbol may be associated with expressions for producing the initial scalar value of an aggregate and a binary function for combining the current partial scalar aggregate with a new element. These expressions may be specified in a programming language such as the .NET expression tree language, or a general-purpose programming language such as C# or Java, for example.

If an operator symbol is associated with one or more user-defined expressions, the automaton engine 230 may generate code in another programming language, such as C#, for example, and insert that code into the non-iterator-based expression.

In some implementations, the optimizer 120 may further support optimizing source code 116 that includes nested iterator-based queries such as nested declarative queries. An example nested query is described below with respect to the example program (5):

$$xs.\text{SelectMany}(x=>ys.\text{SelectMany}(y=>zs.\text{Select}(z=>F(x,y,z)))); \qquad (5)$$

As illustrated, the zs.Select declarative query is nested in the ys.SelectMany declarative query, and the ys.SelectMany declarative query is further nested in the xs.SelectMany declarative query. In order to support such nested declarative queries, intermediate language generator 210 may generate strings according to the following context-free grammar (6):

$$<\text{declarative query}>::=c(\pi|\sigma|<\text{declarative query}>)^*\alpha^?r \quad (6)$$

In order to facilitate the context-free grammar, in some implementations, the automaton engine 230 may generate one or more non-iterator-based expressions from a string in the context-free grammar using multiple instances of the finite state machine 300. Each time the automaton engine 230 encounters a new declarative query in a string, the automaton engine 230 may generate another instance of the finite state machine 300, and may place a current version of the finite state machine 300 onto a stack, or other data structure, and may begin processing the new declarative query with a new instance of the finite state machine 300. Each time the automaton engine 230 encounters the end of a declarative query in a string, the automaton engine 230 may remove a current top-most instance of the finite state machine 300 from the stack, and continue in the current state of the new top-most instance of the finite state machine 300 in the stack, if one exists. The automaton engine 230 may continue processing a string until the end of the string is reached, and no finite state machines remain on the stack.

Figure 4:
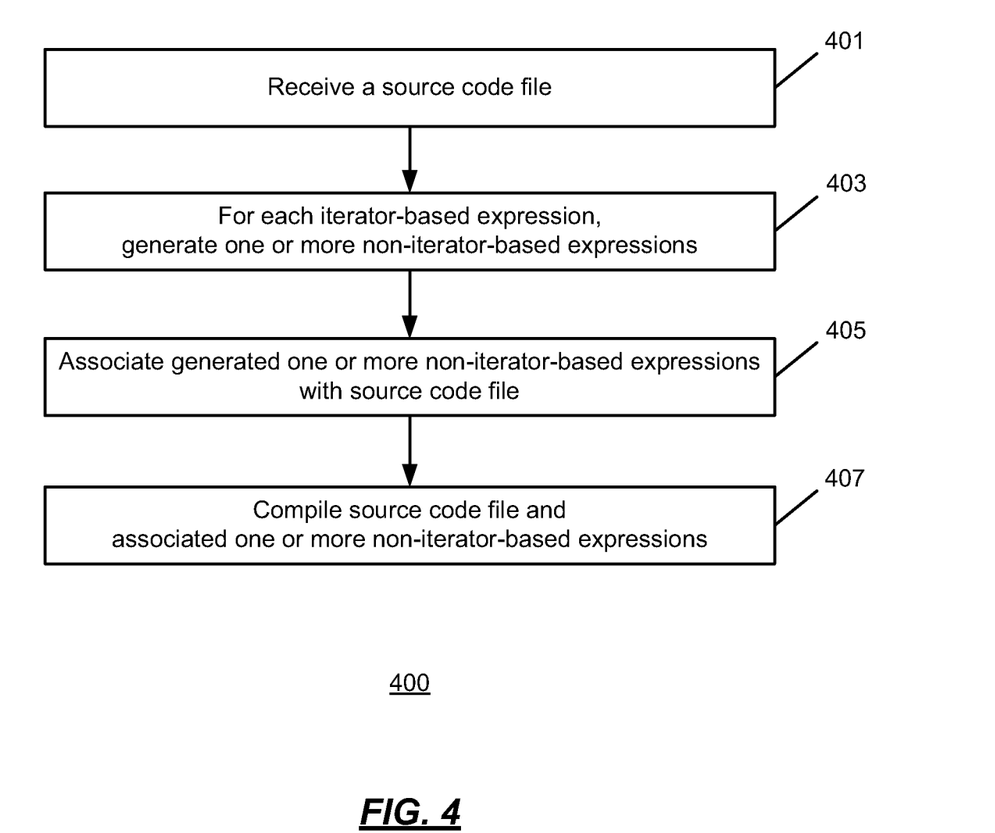
FIG. 4 is an operational flow of an implementation of a method for optimizing and compiling a source code file.

FIG. 4 is an operational flow of an implementation of a method 400 for optimizing and compiling a source code file. The method 400 may be implemented by the computing device 110, for example.

A source code file is received at 401. The source code file may comprise the source code 116 and may be received by the optimizer 120 from the programming application 115. The source code file may be written in a programming language that uses iterator-based expressions, such as LINQ or Java. The iterator-based expressions may include declarative queries or other iterator-based expressions, for example.

For each iterator-based expression, one or more non-iterator-based expressions are generated at 403. The non-iterator-based expressions may be generated by the optimizer 120. The one or more non-iterator-based expressions that are generated for an iterator-based expression may be functionally equivalent to the iterator-based expression, but may be made up of expressions in the programming language that do not include or use iterators.

In some implementations, the optimizer 120 may generate a string in an intermediate language and may process each string using an automaton that replaces the iterator-based expression with statements such as "for" loops and "if" statements. Other methods for generating the non-iterator-based expression may be used.

In some implementations, the optimizer 120 may identify one or more object references included in the iterator-based expressions and may replace the object references with place holders using instance variables. The location of the place holder may be stored by the optimizer 120, and may be used later by the compiler 130 based on one or more captured objects, for example.

The generated one or more non-iterator-based expressions may be associated with the source code file at 405. The one or more non-iterator-based expressions may be associated with the source code file by the optimizer 120. In some implementations, the one or more non-iterator-based expression may be associated with the source code by replacing the one or more iterator-based expressions in the source code file with their corresponding non-iterator-based expressions. In other implementations, the optimizer 120 may associate the one or more non-iterator-based expressions with the source code using a dynamic link library. Other methods for associating the non-iterator-based expressions with the source code file may also be used.

The source code file and associated one or more non-iterator-based expressions are compiled at 407. The source code file and the one or more associated non-iterator-based expressions may be the optimized code 121 and may be compiled by the compiler 130. In some implementations, the compiler 130 may further update any identified query objects of the non-iterator-based expression with the captured objects, if any, described at 403. The result of the compilation may be an executable file.

Figure 5:
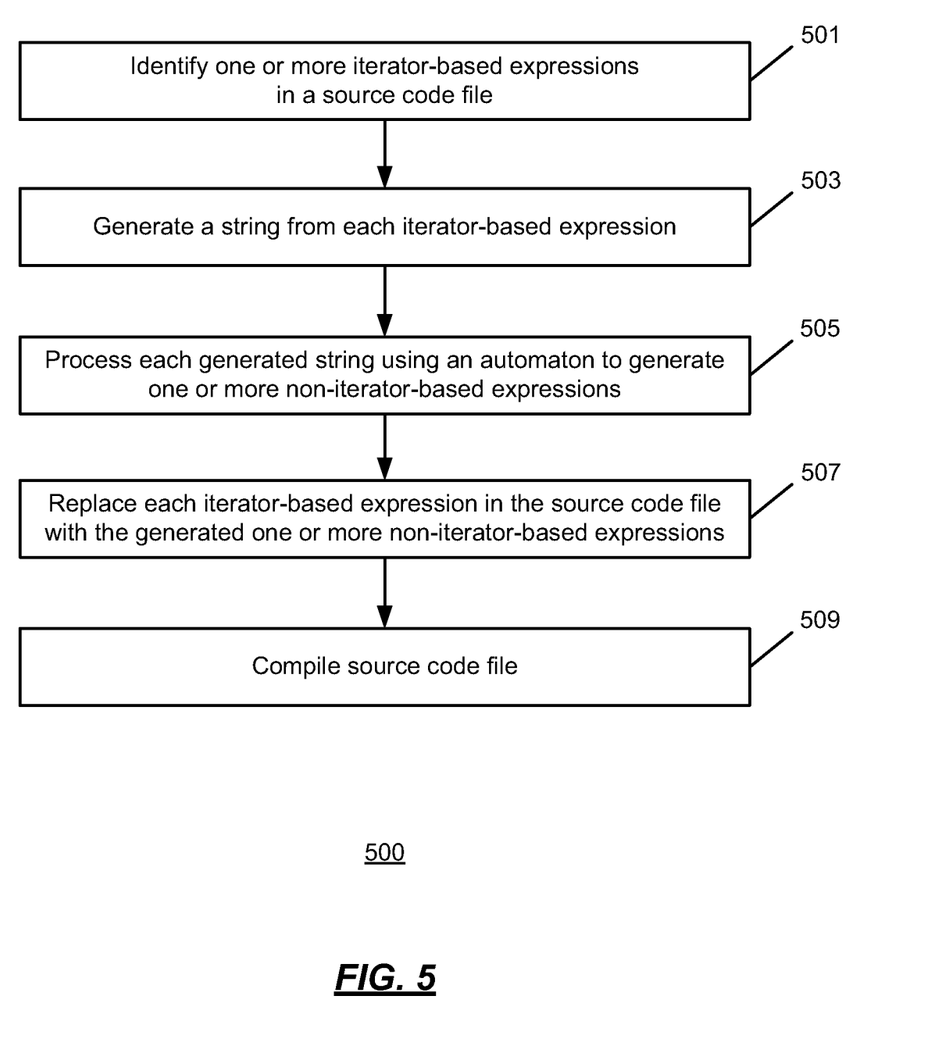
FIG. 5 is an operational flow of another implementation of a method for optimizing and compiling a source code file.

FIG. 5 is an operational flow of an implementation of a method 500 for optimizing and compiling a source code file. The method 500 may be implemented by the optimizer 120 of the computing device 110, for example.

One or more iterator-based expressions are identified in a source code file at 501. The iterator-based expression may be identified by the optimizer 120. In some implementations, the iterator-based expressions may comprise declarative queries.

A string is generated from each iterator-based expression at 503. Each string may be generated by the intermediate language generator 210 of the optimizer 120. The intermediate language generator 210 may generate the string by replacing each operator in the iterator-based expression with one or more symbols or characters corresponding to a class associated with the operator. In some implementations, the operator classes may include aggregate operators, element-wise operators, and sink operators. Other operator classes may also be supported.

Each generated string is processed to generate one or more non-iterator-based expressions at 505. The generated strings may be processed by the automaton engine 230 of the optimizer 120. In some implementations, each string may be generated by the automaton engine 230 using a finite state machine, such as the finite state machine 300. Where the string includes nested iterator-based expressions, the automaton engine 230 may generate an instance of the finite state machine 300 for each level of nesting in the iterator-based expression.

Each iterator-based expression in the source code file is replaced with the generated one or more non-iterator-based expression at 507. The iterator-based expressions may be replaced by the one or more non-iterator-based expressions by the automaton engine 230 of the optimizer 120. The source code file is compiled at 509. The source code may be compiled using compiler 130.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing system 600. In its most basic configuration, computing system 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing system 600 may have additional features/functionality. For example, computing system 600 may include additional storage (removable and/or non-removable) including, but not limited to, magnetic or optical disks or tape. Such additional storage is illustrated in FIG. 6 by removable storage 608 and non-removable storage 610.

Computing system 600 typically includes a variety of computer readable media. Computer readable media can be any available media that can be accessed by computing system 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 600. Any such computer storage media may be part of computing system 600.

Computing system 600 may contain communications connection(s) 612 that allow the device to communicate with other devices. Computing system 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving, by a computing device, a source code file comprising one or more iterator-based expressions, wherein an iterator is an abstraction between an internal representation of a data structure and one or more functions that operate on the data structure, and an iterator-based expression is an expression that uses an iterator;
   for each of the one or more iterator-based expressions:
     replacing one or more operators in the iterator-based expression with one or more symbols corresponding to an operator class associated with each of the one or more operators by the computing device;
     generating a string comprising the iterator-based expression with the replaced one or more operators by the computing device; and
     processing the generated string to generate one or more non-iterator-based expressions that are functionally equivalent to the iterator-based expression by the computing device;
   associating, by the computing device, the generated one or more non-iterator-based expressions with the source code file; and
   compiling the source code file and the associated one or more non-iterator-based expressions to generate a computer executable program.

2. The method of claim 1, wherein the source code file comprises a Java source code file, or a source code file of a programming language that supports the language integrated query ("LINQ") programming language extensions.

3. The method of claim 1, wherein the one or more iterator-based expressions comprise declarative queries.

4. The method of claim 1, wherein the one or more iterator-based expressions include one or more virtual function calls.

5. The method of claim 1, wherein associating the generated one or more non-iterator-based expressions with the source code file comprises linking the generated one or more non-iterator-based expressions with the source code file.

6. The method of claim 1, wherein
   processing the generated string to generate the one or more non-iterator-based expressions that are functionally equivalent to the iterator-based expression comprises processing the generated string using an automaton.

7. The method of claim 1 wherein the operator class comprises one of sink operators, aggregating operators, or element-wise operators.

8. The method of claim 1, wherein the one or more iterator-based expressions comprise nested declarative queries.

9. A method comprising:
identifying one or more iterator-based expressions in a source code file by a computing device, wherein an iterator is an abstraction between an internal representation of a data structure and one or more functions that operate on the data structure, and an iterator-based expression is an expression that uses an iterator;
for each identified iterator-based expression:
replacing one or more operators in the iterator-based expression with one or more symbols corresponding to an operator class associated with each of the one or more operators by the computing device;
generating a string comprising the iterator-based expression with the replaced one or more operators by the computing device;
processing the generated string using an automaton to generate one or more non-iterator-based expressions that are functionally equivalent to the iterator-based expression by the computing device; and
replacing the iterator-based expression in the source code file with the generated one or more non-iterator-based expressions by the computing device; and
compiling the source code file to generate a computer executable program by the computing device.

10. The method of claim 9, wherein the source code file comprises a Java source code file, or a source code file of a programming language that supports the language integrated query ("LINQ") programming language extensions.

11. The method of claim 9, wherein the one or more iterator-based expressions comprise declarative queries.

12. The method of claim 9, wherein the one or more iterator-based expressions include one or more virtual function calls.

13. A system comprising:
at least one computing device;
memory;
a programming application to generate a source code file that comprises at least one iterator-based expression, wherein an iterator is an abstraction between internal representation of a data structure and one or more functions that operate on the data structure, and an iterator-based expression is an expression that uses an iterator;
an optimizer to:
for each iterator-based expression:
replace one or more operators in the iterator-based expression with one or more symbols corresponding to an operator class associated with each of the one or more operators;
generate a string comprising the iterator-based expression with the replaced one or more operators; and
process the generated string to generate one or more non-iterator-based expressions that are functionally equivalent to the iterator-based expression; and
associate the generated one or more non-iterator-based expressions with the source code file; and
a compiler to compile the source code file and the associated one or more non-iterator-based expressions to generate a computer executable program.

14. The system of claim 13, wherein the source code file comprises a Java source code file, or a source code file of a programming language that supports the language integrated query ("LINQ") programming language extensions.

15. The system of claim 13, wherein the at least one iterator-based expression comprises a declarative query.

16. The system of claim 13, wherein the at least one iterator-based expression includes at least one virtual function call.

17. The system of claim 13, wherein the optimizer associates the generated one or more non-iterator-based expressions with the source code file by linking the generated one or more non-iterator-based expression with the source code file.

18. The system of claim 13, wherein
processing the generated string to generate the one or more non-iterator-based expressions that are functionally equivalent to the iterator-based expression comprises processing the generated string using an automaton.

* * * * *